United States Patent [19]

Fratta

[11] Patent Number: 4,924,130
[45] Date of Patent: May 8, 1990

[54] RELUCTANCE SYNCHRONOUS ELECTRIC MACHINE HAVING INTRINSIC PHASE CORRECTION MEANS

[76] Inventor: Antonino Fratta, Via Cristalliera 17, I-10139 Torino, Italy

[21] Appl. No.: 330,471

[22] Filed: Mar. 30, 1989

[30] Foreign Application Priority Data

Apr. 21, 1988 [IT] Italy ................ 67370 A/88

[51] Int. Cl.$^5$ ...................... H02K 1/22; H02K 21/12; H02K 21/00
[52] U.S. Cl. .................................. 310/261; 310/156; 310/162
[58] Field of Search ............... 310/156, 166, 168, 162, 310/163, 256, 261, 262, 264, 265, 269

[56] References Cited

U.S. PATENT DOCUMENTS 3,671,789 6/1972 Menzies ................................ 310/163
4,139,790 2/1979 Steen .................................... 310/156

FOREIGN PATENT DOCUMENTS 1114562 2/1966 United Kingdom .

Primary Examiner—Patrick R. Salce
Assistant Examiner—C. Laballe
Attorney, Agent, or Firm—Young & Thompson

[57] ABSTRACT

A reluctance synchronous electric machine whose rotor is of the kind with a magnetically axial segmentation and includes magnetically axial layers of a ferromagnetic material alternated with intercalary layers of a non-ferromagnetic material. Some permanent magnets are inserted within the intercalary layers and they are oriented in such a way that they produce a magnetic flux oriented along the quadrature axis of the rotor in the sense opposite the magnetic flux produced along the same quadrature axis by the feed current flowing through the stator windings. Preferably the permanent magnets are proportioned in order to compensate at least by approximation the magnetic flux along the quadrature axis when the current flowing through the stator windings is the nominal current of the machine. The ferromagnetic sheets forming the ferromagnetic layers may be disposed so as to extend materially in axial direction, or to extend materially in transverse direction, being provided in this case with flux guides which define magnetically axial ferromagnetic layers. Bridges magnetically saturated by the permanent magnets may be provided for in the rotor structure.

12 Claims, 2 Drawing Sheets

RELUCTANCE SYNCHRONOUS ELECTRIC MACHINE HAVING INTRINSIC PHASE CORRECTION MEANS

CROSS REFERENCE TO RELATED APPLICATIONS

This invention refers to the subject matter of copending U.S. Patent Application Ser. No. 186,091 by the same Inventor.

BACKGROUND OF THE INVENTION

This invention refers to a reluctance synchronous electric machine fed by an electronic power circuit by vectorial control of the feed current.

According to the state of art preceding this invention, the system formed by an alternate current electric machine (and therefore, in particular, by a reluctance synchronous machine), by the pertinent electronic feed circuit (inverter) and by its circuit for a vectorial control (in amplitude and phase) of the feed current, cannot be designed such as to exploit in the more favorable manner both the characteristics of the machine and the characteristics of the inverter.

In effect it is noticed that, in order to suitably exploit the characteristics of the inverter, the machine should be proportioned for delivering a maximum power greater than that really allowed by the inverter, whereas on the contrary, in order to suitably exploit the characteristics of the machine, the inverter should be proportioned for delivering a maximum power greater than that allowed by the machine. This is particularly burdensome in the frequent case in which the machine is required to deliver a constant torque (corresponding to a prefixed maximum value) at any speed lower than an intermediate speed at which, with said prefixed constant torque, a fixed maximum value of power is delivered, whereas the machine should deliver a constant power, corresponding to the above cited fixed maximum value of power, within a large range of speed over said intermediate speed. In order that this may be possible, the inverter should be proportioned for feeding the nominal current needed for producing the prefixed maximum torque, as well as for feeding the maximum voltage needed for delivering the prefixed maximum power up to the maximum speed. The product of the nominal current multiplied by the maximum voltage is a socalled "dimensioning power", for which the inverter should be proportioned, and it may be much greater than the maximum mechanical power intended to be delivered.

This may be well understood with reference to the vectorial diagram of FIG. 1. It should be noted that the distribution of sinusoidal magnetomotive force generated by the stator winding of the machine may be construed as resolved in two sinusoidal distributions of magnetomotive force, directed along the direct axis (d) of the rotor and the quadrature axis (q) of the rotor, respectively. On their turn, these distributions of magnetomotive force may be construed as produced by two conductor distributions through which flow electrical currents $i_d$ and $i_q$, respectively. The magnetic fluxes $\lambda_d$ and $\lambda_q$, directed along the axes d and q, respectively, which chain the two windings corresponding to said conductor distributions, are given by the respective currents $i_d$ and $i_q$ multiplied by the respective self-inductances $L_d$ and $L_q$, which are characteristic of the magnetic construction of the rotor: $\lambda_d = L_d \cdot i_d$; $\lambda_q = L_q \cdot i_q$.

The total vectors of current (i) and magnetic flux ($\lambda$) result from the vectorial sum of the respective components ($i_d$, $i_q$ and $\lambda_d$, $\lambda_q$) along the axes d and q, respectively, of the rotor. The angular speed of the rotor with respect to the stator will be indicated as $\omega$. The analysis of the system shows that, if the resistive drops are disregarded, and a stationary distribution of the magnetic state is taken into account, the resulting voltage vector v, which is suitable for giving rise to the current vector i into the stator winding, is in advance and in quadrature with respect to the flux vector $\lambda$. The vector v subtends with the vector i an angle $\phi$. By denoting as T the produced mechanical torque, and henceforth $\omega \cdot T$ the delivered mechanical power, the apparent input electrical power is $v \cdot i$, the active input electrical power is $v \cdot i \cdot \cos\phi = \omega \cdot T$, and the amplitude of the voltage v needed for producing the magnetic fluxes involved is $v = \omega \sqrt{\lambda_d^2 + \lambda_q^2}$. The general formula which gives the torque is $T = \lambda_d \cdot i_q - \lambda_q \cdot i_d$.

It may be shown that the maximum torque which may be produced without overcoming a maximum voltage $V_M$ is obtained when $|\lambda_d| = |\lambda_q| = V_M/\omega\sqrt{2}$, and it is $T_{max} = (1/L_q - 1/L_d) \cdot V_M^2/2\omega^2$, whereby the maximum power is $P_{max} = (1/L_q - 1/L_d) \cdot V_M^2/2\omega$.

As a consequence, the maximum voltage $V_M$ which should be applied in order to obtain the power $P_{max}$ increases with the maximum angular speed $\omega$ at which said power is to be delivered, namely with the extent of the range wherein the operation at constant power is required. If $I_o$ is the nominal current foreseen for the machine, the proportioning power (for which the inverter should be proportioned) is $V_M \cdot I_o$: it is much greater than the mechanical power $\omega \cdot T$ which may be delivered by the system, and it increases with the extent of the speed range wherein an operation at constant mechanical power is required.

BRIEF SUMMARY OF THE INVENTION

In view of the above, the object of this invention is to allow a more favorable exploitation of the characteristics of a system comprising a reluctance electric machine and the pertinent electronic power circuit (inverter) intended for feeding the machine, by avoiding the need for proportioning the inverter in view of a dimensioning power much greater than the active power required. The conception on which the invention is based is to foresee for the rotor a particular structure which, in the nominal conditions of operation, gives rise to a reduced value (tending to null) of the magnetic flux along the quadrature axis, which gives a negative contribute to the produced torque and corresponds to a voltage component along the direct axis, which increases the amplitude of the voltage when a mechanical power is generated.

The object of the invention is attained by means of a reluctance synchronous electric machine having a rotor with an axial magnetic segmentation comprising axial layers of ferromagnetic material alternated with intercalary layers of non-ferromagnetic material, characterized in that some permanent magnets are inserted within said intercalary non-ferromagnetic layers, with an orientation such as to give rise to a magnetic flux along the direction of the quadrature axis and in the sense opposite the magnetic flux produced by the quadrature component of the current which flows through the stator windings.

Preferably said permanent magnets are proportioned in such a way that the magnetic flux produced by them has equal amplitude and sense opposite the magnetic flux produced by the quadrature component of the current which flows through the stator windings when the machine is in the nominal conditions of operation.

Due to this characteristic, the magnetic flux component present along the quadrature axis of the rotor is in any event smaller than that which would be present in the absence of the features according to the invention and, when the above stated preferred proportions are adopted, it may even be null during the nominal operation of the machine. As a consequence, the component of counterelectromotive force produced by said magnetic flux within the stator winding by action of the rotor rotation is smaller or respectively null. It is this component of counterelectromotive force which should be opposed by a component along the direct axis of the voltage applied to the stator in order that the current needed for the machine operation can be caused into the stator winding. By reducing the component along the direct axis of the voltage to be applied, the amplitude of this voltage is reduced too, and therefore the proportions of the inverter may be reduced. At the limit condition, namely when the above stated preferred proportions are adopted, the inverter needs only to be proportioned in view of the active electrical power corresponding to the mechanical power delivered by the machine at full load.

The vectorial diagram of FIG. 2 refers to the case of the above stated preferred proportions, and the component of the current along the direct axis is supposed to be negligeable, as it really happens during the operation of the machine at high speed and with a reduced magnetic flux. The absolute value of the magnetic flux produced by the permanent magnets is indicated as $\psi_M$. The component of magnetic flux along the quadrature axis is $\lambda_q = L_q \cdot i_q - \psi_M$. In accordance with the preferred proportions, it is $\psi_M = L_q \cdot I_o$, and therefore the component $\lambda_q$ is null when the machine operates under the nominal current $I_o$. In these conditions, the total magnetic flux $\lambda$ is equal to the component $\lambda_d$ of the magnetic flux, and it is oriented along the direct axis d; the component $i_q$ of the current along the quadrature axis is equal to the nominal current $I_o$; and the total voltage applied is equal to the voltage component along the quadrature axis: $v = \omega \cdot \lambda = v_q$, and it is oriented along the quadrature axis q. There is no phase shift $\phi$ between voltage and current, namely the machine, in the stated conditions, is completely corrected from phase shift; the apparent electric power is equal to the active electric power and to the delivered mechanical power, and therefore the inverter may be proportioned in view of this latter only.

Of course, such conditions are not verified during the operation under a current smaller than the nominal current, and also when non-stationary conditions of the magnetic circuit are taken into account. In addition, theoretically the current component $i_d$ along the direct axis is to be taken into account, but in a reluctance electric machine with axial magnetic segmentation this current component, although not null, is much smaller than the quadrature component $i_q$, and therefore it modifies only to a very little extent the above conclusions.

The phase correction of the machine is obtained thanks to the magnetic flux produced by the permanent magnets, and this magnetic flux should be proportioned to the magnetic flux component along the quadrature axis produced by the current. Therefore it is of advantage, in the interest of the proportions of the permanent magnets, that the self-inductance $L_q$ shown by the rotor along the quadrature axis is as low as possible. In addition, the current component along the direct axis, needed for producing the magnetic flux, does not correspond to the ideal case of FIG. 2, and therefore it is of advantage that the self-inductance $L_d$ shown by the rotor along the direct axis is as high as possible. Both above considerations are abridged by the condition that the ratio $L_q/L_d$ should be as low as possible. It is therefore of advantage that a suitable structure is adopted for the rotor, more particularly a structure of the kind according to the copending U.S. Patent Application Ser. No. 186,091. This latter is formed by an axial magnetic segmentation comprising layers of ferromagnetic material alternated with intercalary layers of non-ferromagnetic material having a thickness of not less than ⅜ of the thickness of the layers of ferromagnetic material.

In view of the above, a reluctance electric machine embodying the features of the present invention is intrinsecally phase-corrected in the operative conditions in which it delivers the prefixed mechanical power required.

BRIEF DESCRIPTION OF THE DRAWINGS

The above and other characteristics and advantages of the subject of the invention will appear more clearly from the following description of some preferred embodiments, having exemplary and not limitative character and diagrammatically shown in the annexed drawings, wherein.

DETAILED DESCRIPTION OF THE PREFERRED EMBODIMENTS

Figure 3:
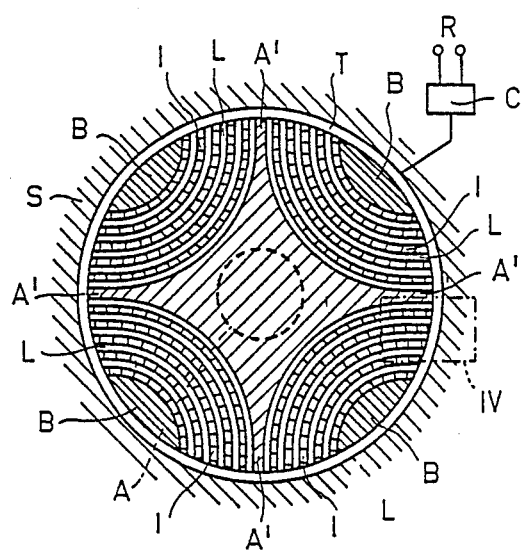
FIG. 3 diagrammatically shows a first embodiment of the structure of a machine having a rotor with axial magnetically decreased segmentations, embodying the features of the invention.
Figure 4:
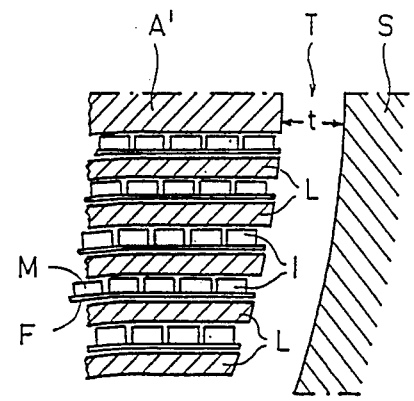
FIG. 4 shows on a greater scale the detail IV of FIG. 3.

With reference to FIGS. 3 and 4, letter S denotes an electric machine stator, whose structure is not better detailed because it may be of any kind of stator known for the considered type of machines or for other types of synchronous or asynchronous electric machines. In most cases, but not in binding manner, stator S may have a structure with a polyphase distributed winding. It should be noted that the structure of stator S has per se no connection with the embodiment of the invention.

It is diagrammatically shown in FIG. 3 that stator S is connected to a feed circuit C inserted between stator S and an electric branch network R. The feed circuit C should be construed as including a power inverter, which feeds stator S, and an electronic circuit for vectorial control (in amplitude and phase) of the feed current delivered by the inverter to the stator. The structure of circuit C is not better detailed because such control circuits are per se well known in the application to other types of electric machines and, generally speaking, any circuit of this kind may be used for feeding the electric machine according to the invention.

In FIGS. 3 and 4, reference T denotes a magnetic gap, of a thickness t, provided between the inner surface of stator S and the outer surface of the rotor. The rotor shown in these Figures has four poles and it is mounted onto a shaft A, which may be of normal steel and extends to form a spider with four arms A' oriented along the two direct axes of the rotor. In the four quadrants delimited by the four arms A' of shaft A there are inserted four curved axial laminations, whose general structure is well known for this type of machines and includes a number of superimposed ferromagnetic sheets L alternated with intercalary non-ferromagnetic layers I. According to the teaching of the copending U.S. Patent Application Ser. No. 186,091 by the same Inventor, said intercalary non-ferromagnetic layers I have a substantial thickness, at least not less than ⅔ of the thickness of the ferromagnetic sheets L.

According to the main feature of this invention, a number of permanent magnets M (FIG. 4) are inserted within the intercalary non-ferromagnetic layers I alternated with the ferromagnetic sheets L. Each permanent magnet M is magnetized along a direction perpendicular to the plane tangent to the intercalary layer I in the point where the considered permanent magnet M is located. The sense of the magnetization of the permanent magnets M is such that all permanent magnets of each quadrant produce, in their whole, a magnetic flux oriented along the direction of the quadrature axis q which passes through the considered quadrant and opposite the magnetic flux generated, in the considered quadrant, by the quadrature component of the electric current which flows through the stator winding.

Figure 1:
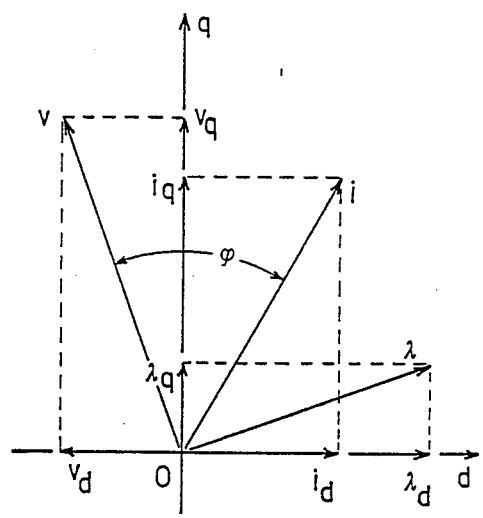
FIG. 1 shows a vectorial diagram, already discussed in the preamble, which refers to a machine according to the former state of art.
Figure 2:
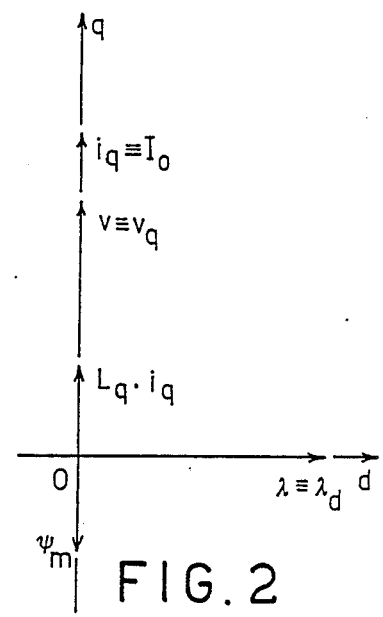
FIG. 2 shows a vectorial diagram, already discussed in the preamble, which refers to a machine embodying the invention.

Taking into account what has been explained with reference to the vectorial diagram of FIG. 2, due to the described arrangement of components of magnetic flux present in the rotor along its quadrature axes are smaller that the components of magnetic flux which would be present in the absence of the permanent magnets M. As a consequence, is also smaller the component along the direct axis of the voltage which the feed circuit should apply to the stator winding; the amplitude of said voltage is reduced too, and the inverter which is part of the feed circuit C may be more strictly dimensioned.

Preferably the characteristics of the permanent magnets M are chosen in such a way that the magnetic flux produced by them is at least approximately equal in amplitude and opposite in sense to the magnetic flux produced by the quadrature component of the current which flows through the stator winding when the machine operates in its nominal operating conditions. In this preferred case, as already explained in the foregoing with reference to the vectorial diagram of FIG. 2, it is sufficient that the inverter be dimensioned in view of an electric power value near the active electric power corresponding to the mechanical power delivered by the machine at full load.

In the middle portion of each curved lamination L,I there is a member B which, for practical reasons of structure and of manufacture, is not segmented, and which defines one of the interpolar spaces of the rotor. When this invention is embodied, it is of advantage that the members B are of ferromagnetic material in order to support the magnetic induction distribution at the magnetic gap, which is produced by the permanent magnets M.

From the constructional point of view, the distribution of permanent magnets M inserted within the intercalary layers I, which in this case are curved, may be embodied by applying a number of permanent magnets M of a little size onto a flexible supporting sheet F (FIG. 4). The pliability of the supporting sheet F allows easily inserting a layer of permanent magnets M between two ferromagnetic sheets L, notwithstanding that these latter are curved.

Figure 5:
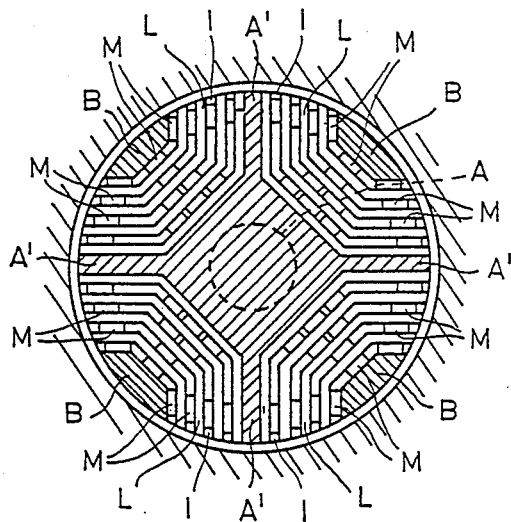
FIGS. 5 and 6 show, in a way similar to that of FIG. 3, two further embodiments of the structure of a machine embodying the features of the invention.

In the embodiment according to FIG. 5, the ferromagnetic sheets L which form a part of the axial laminations are not curved, but they are bent according to a polygonal shape. In this case the intercalary spaces I are formed by plane segments, and permanent magnets M shaped as plane plates may be easily inserted into the intercalary spaces I. As it may be noted from this Figure, the number of permanent magnets forming each layer may be different from the number of permanent magnets forming the other layers. This allows to generate in each layer the more suitable magnetomotive force. However, instead of changing the number of permanent magnets of the different layers, it is also possible to insert in the different layers permanent magnets M having different magnetic characteristics.

From the magnetic point of view, the rotor segmentations should extend axially in order to define axially extending intercalary layers, suitable for receiving the permanent magnet distributions which are characteristic of the invention. To this end, in the embodiments of FIGS. 3 to 5 the rotor laminations include ferromagnetic sheets which materially extend in the axial direction. However it is also possible to obtain magnetically axial segmentations by using ferromagnetic sheets which materially form a transverse lamination, provided that said ferromagnetic sheets show suitable flux guides formed by adequately shaped cavities. An example of such a structure is given by FIG. 6. In this case the rotor comprises a stack of round transverse ferromagnetic sheets, superimposed along the axis of a shaft A onto which they are keyed. In these ferromagnetic sheets there are cut elongated cavities which define the intercalary non-ferromagnetic layers I. These cavities are separated by ferromagnetic portions L which, in the whole of the stacked sheets, define axial layers of ferromagnetic material. In this way, by using a materially transverse lamination, which is preferable from the constructional point of view, a behaviour magnetically equivalent to that of the above described axial laminations may be attained. The ferromagnetic portions which, in the formerly described structures, were formed by the arms A' of shaft A and by the members B of the interpolar spaces, are formed in this structure by corresponding portions A" and B' of the transverse sheets forming the ferromagnetic layers L.

Figure 6:
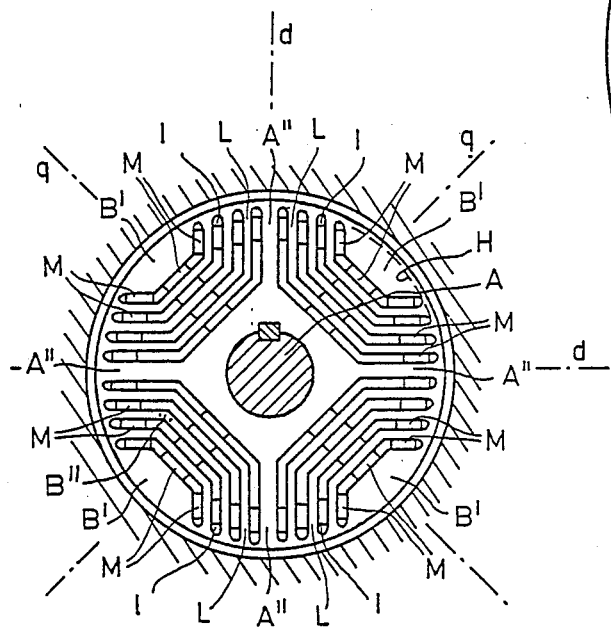

As it may be noted from the same FIG. 6, in the embodiment shown the cavities or flux guides cut through the sheets and defining the intercalary layers I do not extend up to the periphery of the rotor, but they end at a short distance therefrom. In this way, along the periphery of the rotor there is formed a succession of thin ferromagnetic bridges closing the cavities which form the flux guides. In other possible embodiments such bridges could also be provided in some positions different from the peripheral position shown in FIG. 6, namely in internal positions such as B".

Such structures are known per se in the reluctance machines, and their purpose is to ensure to the rotor a mechanical strength suitable for withstand the centrifugal forces which arise during the rotation, without the need for hooping the rotor by means of a material having a high maximum tensile stress, such as carbon fibers. Apart the economical reasons, a hooping is undesirable because it increases the thickness of the magnetic air gap with respect to the geometrical gap.

But on the other hand, a structure including ferromagnetic bridges, either in peripheral or internal positions, in the known machines has the disadvantage of considerably increasing the magnetic permeance along the quadrature axes, and moreover this increase follows a non-linear function of the delivered power, due to the different levels of magnetic saturation in said bridges. In the known machines, the magnetic flux which flows through such bridges, and eventually saturates them, should be produced by the electric feed current, and therefore it has an unfavorable effect onto the behavior of the feed circuit.

On the contrary, with the structure according to the invention, some ferromagnetic bridges, either peripheral or internal, may be provided for in the rotor without incurring any inconvenience, because they may be magnetically saturated by action of the permanent magnets inserted within the intercalary layers, provided, of course, that the cross section of said bridges is suitably limited. In this case, the presence of said ferromagnetic bridges should be taken into account in proportioning the permanent magnets inserted within the intercalary layers: in effect, apart from producing the magnetic flux needed for reducing or suppressing the direct axis component of the voltage to be applied, the magnets should also produce a magnetic flux intended to saturate the peripheral ferromagnetic bridges. When thus magnetically saturated by the permanent magnets, said bridges behave with respect to any other magnetic flux like a non-ferromagnetic material and, if they are located at the periphery, they constitute an ideal extension of the intercalary non-ferromagnetic layers up to the magnetic gap. In these circumstances the power electronic circuit and the control circuit do not suffer any effect from the presence of said bridges.

A similar possibility may be exploited, in the case of a materially axial lamination, by providing a hooping of ferromagnetic material (as diagrammatically shown at H, FIG. 6), and magnetically saturating, by action of the permanent magnets inserted within the intercalary spaces, the hooping portions which are located in front of the ends of said intercalary spaces and constitute ferromagnetic bridges. In this way one can provide more economical hoopings which do not increase the magnetic gap with respect to the geometrical gap.

In order to attain the optimum behaviour of the ferromagnetic material forming the rotor, it is suitable that the magnetic circuit reluctance involved in each magnetic segmentation of the rotor remains substantially unmodified during the changes in the position of the rotor with respect to the stator, and this notwithstanding that the stator is anisotropic due to the presence therein of the slots for the windings. In this case, the magnetomotive force of the magnets inserted within the intercalary layers of the rotor does not induce during the displacements of the rotor any substantial change of magnetic induction in the ferromagnetic layers of the rotor. This condition may be attained, according to a further feature of this invention, when the length of the ferromagnetic layer of each magnetic segmentation of the rotor, measured along the magnetic gap, is equal to the pitch of the stator slots, measured along the magnetic gap. In effect, in this case each ferromagnetic layer of the rotor, in any position, always faces an identical extension of the ferromagnetic material of the stator.

Figure 7:
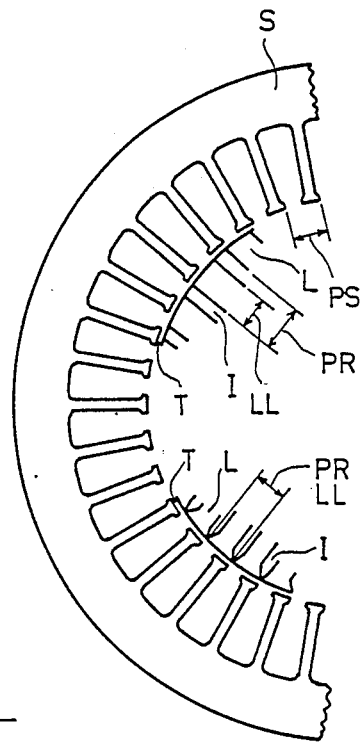
FIG. 7 shows suitable proportioning ratios between the rotor magnetic segmentations and the stator slot pitch in a machine according to the invention.

As shown by the diagrammatic representation of FIG. 7, to this generally expressed condition may correspond two different proportions of the parts, depending upon the intercalary layers separating the magnetic segmentations of the rotor being open towards the magnetic gap (as according to FIG. 5) or closed towards the magnetic gap (as according to FIG. 6).

When the intercalary non-ferromagnetic layers I of the magnetic segmentations of the rotor are substantially open towards the magnetic gap (top portion of the diagram of FIG. 7), whatever may be the pitch PR of the rotor segmentation, the desired condition is attained when the width LL (measured at the magnetic gap) of the ferromagnetic layers L is equal to the pitch PS of the stator slots (also measured at the magnetic gap), or to a multiple thereof. In this case, the width of the intercalary non-ferromagnetic layers I is immaterial.

When the intercalary non-ferromagnetic layers I of the magnetic segmentations of the rotor are substantially closed towards the magnetic gap (bottom portion of the diagram of FIG. 7), whatever may be the width of the ferromagnetic layers L which separate the intercalary non-ferromagnetic layers I, the desired condition is attained when the pitch PR of the magnetic segmentations of the rotor (measured at the magnetic gap) is equal to the pitch PS of the stator slots (also measured at the magnetic gap), or to a multiple thereof. As it may be understood, this is a particular case of the former condition, obtained when the width of the intercalary layers I at the magnetic gap is reduced to null, whereby (only at the magnetic gap) the width LL of the ferromagnetic layers L occupies the entire pitch PR of the magnetic segmentations of the rotor.

In the practice, this latter condition is also valable when the intercalary layers I of the magnetic segmentations of the rotor, instead of being completely closed towards the magnetic gap, are shaped in such a way as to show at the magnetic gap only a little width, of the same order of the thickness of the magnetic gap itself.

In this way, two different possibilities are offered to the designer, who may suitably chose according to the different requirements of the construction. Moreover it should be born in mind that all the stated conditions require only to be observed within a certain approximation, in view of the lines of magnetic induction being capable of a certain divergence in traversing the magnetic gap.

Thanks to the provision of the described means for intrinsic phase correction, the reluctance synchronous electric machine according to the invention allows providing systems, comprising the machine itself and the pertinent electronic feed circuit with vectorial current control, wherein both the characteristics of the machine and the characteristics of the inverter included in the feed circuit are exploited in the more favorable manner.

I claim:

1. A reluctance synchronous electric machine, comprising a stator having slots arranged according to a predetermined pitch and electric windings inserted in said slots, a feed circuit delivering feed current to said windings for producing a magnetic flux, a rotor inserted into said stator and separated from said stator by a magnetic gap, said rotor including axial magnetic segmentations comprising magnetically axial layers of ferromagnetic material alternated with magnetically axial intercalary layers of non-ferromagnetic material, said ferromagnetic layers and intercalary layers defining in the rotor at least one direct axis and at least one quadrature axis, and permanent magnets inserted within said intercalary non-ferromagnetic layers said permanent magnets being oriented for producing a magnetic flux along the direction of said quadrature axis and in the sense opposite the magnetic flux produced along the same quadrature axis by the feed current which flows through the stator windings, the length of the ferromagnetic layer of each magnetic segmentation of the rotor, measured along the magnetic gap, being substantially equal to the pitch of the stator slots, also measured along the magnetic gap.

2. A reluctance machine as set forth in claim 1, wherein said permanent magnets are proportioned for producing a magnetic flux having equal amplitude and sense opposite the magnetic flux produced along the quadrature axis of the rotor by the feed current which flows through the stator windings when the machine is in the nominal conditions of operation.

3. A reluctance machine as set forth in claim 1, further comprising ferromagnetic members located in the middle of said magnetic segmentations and defining interpolar spaces of the rotor.

4. A reluctance machine as set forth in claim 1, wherein said magnetic segmentations comprise ferromagnetic sheets materially extending in the axial direction of the rotor.

5. A reluctance machine as set forth in claim 1, wherein said magnetic segmentations comprise ferromagnetic sheets materially extending of the rotor, and said ferromagnetic sheets have flux guides which define therein magnetically axial layers.

6. A reluctance machine as set forth in claim 1, further comprising flexible supporting sheets, and wherein said permanent magnets are in the form of plates of small size and are applied onto said flexible supporting sheets.

7. A reluctance machine as set forth in claim 1, wherein said permanent magnets inserted within the intercalary layers change in their number or in their magnetic characteristics from each intercalary layer to each other.

8. A reluctance machine as set forth in claim 1, wherein said layers of ferromagnetic material of the magnetic segmentations comprise ferromagnetic bridges located peripherally or internally to the rotor, said bridges connecting each ferromagnetic layer to each other, and wherein said permanent magnets are proportioned for further producing a magnetic flux capable of magnetically saturating said bridges.

9. A reluctance machine as set forth in claim 4, further comprising a rotor hooping of a ferromagnetic material, and wherein the portions of said hooping corresponding to said intercalary layers and forming ferromagnetic bridges are magnetically saturated by said permanent magnets inserted in the intercalary layers of the rotor.

10. A reluctance machine as set forth in claim 5, wherein said ferromagnetic sheets materially extending in a transverse direction comprise portions bridging, in peripheral or internal position, the intercalary non-ferromagnetic layers, and wherein said bridging portions are magnetically saturated by said permanent magnets inserted in the intercalary layers of the rotor.

11. A reluctance machine as set forth in claim 1, wherein said intercalary non-ferromagnetic layers are substantially open towards the magnetic gap, and the width of the ferromagnetic layers, measured at the magnetic gap, is approximately equal to the pitch of the stator slots, measured at the magnetic gap, or to a multiple thereof.

12. A reluctance machine as set forth in claim 1, wherein said intercalary non-ferromagnetic layers are substantially closed towards the magnetic gap, and the pitch of the magnetic segmentations of the rotor, measured at the magnetic gap, is approximately equal to the pitch of the stator slots, measured at the magnetic gap, or to a multiple thereof.

* * * * *

UNITED STATES PATENT AND TRADEMARK OFFICE
CERTIFICATE OF CORRECTION

PATENT NO. : 4,924,130

DATED : May 8, 1990

INVENTOR(S) : Antonino FRATTA

It is certified that error appears in the above—identified patent and that said Letters Patent is hereby corrected as shown below:

Column 9, line 17, change "slots," to --slots or to a multiple thereof,--.

Signed and Sealed this

Twenty-first Day of April, 1992

Attest:

HARRY F. MANBECK, JR.

*Attesting Officer*      *Commissioner of Patents and Trademarks*